UNITED STATES PATENT OFFICE.

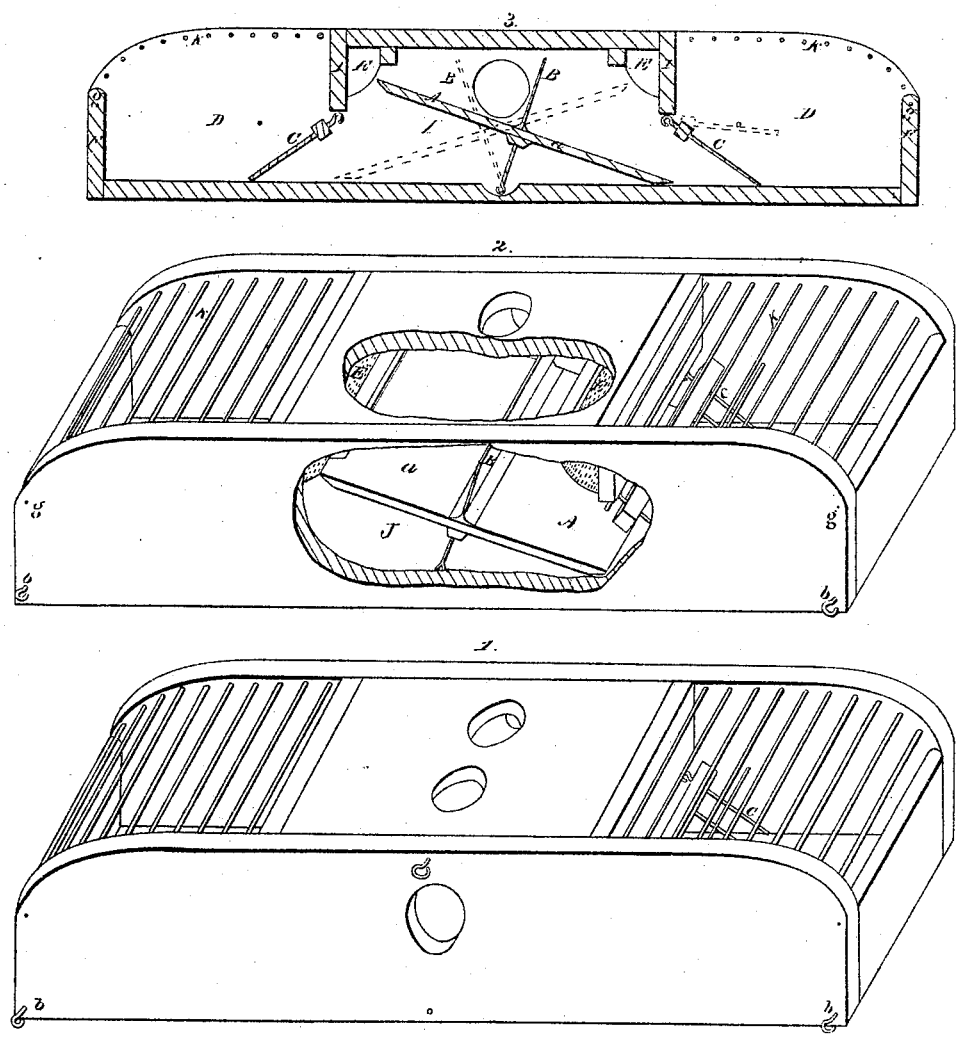
L. J. Baker,
Cage Trap.
N° 51,283.
Patented Dec. 5, 1865.
Witnesses
Inventor

LORING J. BAKER, OF EAST MACHIAS, MAINE.

IMPROVEMENT IN ANIMAL-TRAPS.

Specification forming part of Letters Patent No. 51,283, dated December 5, 1865.

*To all whom it may concern:*

Be it known that I, LORING J. BAKER, of East Machias, in the county of Washington and State of Maine, have invented a new Machine for Catching Animals, called the "Perpetual Animal-Trap;" and I do hereby declare that the following is a full, clear, and exact description of the construction and operation of the same, reference being had to the annexed drawings, making a part of this specification, in which—

Figure 1 is a perspective view. Fig. 2 is a perspective view, with a part of the cover and side broken out to show the rocking platform; and it shows also both bait-boxes and one of the movable gates. Fig. 3 is a longitudinal section.

The first figure shows the case and the holes in the top and sides, where the animals go in onto the rocking platform, (marked A in Figs. 2 and 3,) the operation of which is as follows: When the animals go in onto the rocking platform, it being hung in the center, it tips down, as shown by the dotted lines in Fig. 3. When said rocking platform has tipped, as already described, the partition B, which is affixed to the platform, changes over to B' (dotted line) and closes the apertures, which prevents the escape of the animals, at the same time opening the aperture for the opposite end of the platform, which makes it a perpetually-set trap. Seeing the light through the grating, they pass under the movable gates C C into the chambers D D.

The bait-boxes marked E E at the extremities of the platform are to tempt the animals into said trap, and, being at the ends of the platform, insure an operation which secures the animal.

F F are swinging doors that let the animals out, and are hung on pivots G G, fastened by the pins H H.

I I are partitions above the movable gates, which, together with the movable gates, separate the chambers D D from the platform-chamber J. The gratings K K secure the animals in said chambers.

I claim—

The rocking platform A and its partition B, which, by its operation, opens the aperture alternately to either side, as described, making a perpetual trap.

LORING J. BAKER.

Witnesses:
    A. McNICHOL,
    B. ROGERS.